(12) United States Patent
Flachsbart et al.

(10) Patent No.: US 12,135,550 B1
(45) Date of Patent: *Nov. 5, 2024

(54) AUTONOMOUS VEHICLE CONTROL SYSTEM AND METHOD

(71) Applicant: United Services Automobile Association (USAA), San Antonio, TX (US)

(72) Inventors: Matthew T. Flachsbart, Grapevine, TX (US); Cory A. Matheson, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/717,863

(22) Filed: Apr. 11, 2022

Related U.S. Application Data (63) Continuation of application No. 16/704,884, filed on Dec. 5, 2019, now Pat. No. 11,300,956, which is a continuation of application No. 15/942,912, filed on Apr. 2, 2018, now Pat. No. 10,520,942.

(60) Provisional application No. 62/481,442, filed on Apr. 4, 2017.

(51) Int. Cl.
  *G05D 1/00* (2024.01)
  *G06Q 10/0631* (2023.01)
  *G06Q 30/0207* (2023.01)

(52) U.S. Cl.
  CPC ......... *G05D 1/0088* (2013.01); *G05D 1/0297* (2013.01); *G06Q 10/06315* (2013.01); *G06Q 30/0219* (2013.01)

(58) Field of Classification Search
  CPC .............. G05D 1/0088; G05D 1/0297; G06Q 10/06315; G06Q 30/0219
  USPC ........................................................... 701/23
  See application file for complete search history.

(56) References Cited

U.S. PATENT DOCUMENTS

| | | |
|---|---|---|
| 9,195,938 B1 | 11/2015 | Bonawitz et al. |
| 10,520,942 B1 * | 12/2019 | Flachsbart ........... G05D 1/0297 |
| 10,599,143 B1 | 3/2020 | Scott et al. |
| 11,300,956 B1 * | 4/2022 | Flachsbart ........... G05D 1/0088 |
| 2012/0083964 A1 | 4/2012 | Montemerlo et al. |

(Continued)

*Primary Examiner* — Tyler D Paige
(74) *Attorney, Agent, or Firm* — Fletcher Yoder, PC (57) ABSTRACT

An autonomous vehicle control system includes a first autonomous vehicle control center at a first location, and a second autonomous vehicle control center at a second location. The system also includes a controller configured to receive a first data input from the first autonomous vehicle control center and indicative of a first characteristic of the first autonomous vehicle control center, to receive a second data input from the second autonomous vehicle control center and indicative of a second characteristic of the second autonomous vehicle control center, and to receive a third data input indicative of an autonomous vehicle transport request or an autonomous vehicle storage request. The controller is also configured to select the first autonomous vehicle control center or the second autonomous vehicle control center based at least in part on the first data input, the second data input, and the third data input. Further, the controller is configured to instruct fulfillment of the autonomous vehicle transport request or the autonomous vehicle storage request based on the selection.

20 Claims, 6 Drawing Sheets

(56) References Cited

U.S. PATENT DOCUMENTS

| | | | |
|---|---|---|---|
| 2014/0358353 A1* | 12/2014 | Ibanez-Guzman | ................... B60W 60/0025 701/23 |
| 2015/0033647 A1 | 2/2015 | Suhami | |
| 2015/0233719 A1* | 8/2015 | Cudak | ................... B60R 25/241 701/23 |
| 2015/0338852 A1 | 11/2015 | Ramanujam | |
| 2015/0339928 A1* | 11/2015 | Ramanujam | ........... G08G 1/202 701/23 |
| 2015/0379468 A1 | 12/2015 | Harvey | |
| 2016/0209845 A1 | 7/2016 | Kojo et al. | |
| 2016/0247106 A1* | 8/2016 | Dalloro | ............ G06Q 10/06313 |
| 2016/0342915 A1 | 11/2016 | Humphrey | |
| 2017/0059336 A1 | 3/2017 | Huang et al. | |
| 2017/0147959 A1 | 5/2017 | Sweeney et al. | |
| 2017/0267233 A1 | 9/2017 | Minster et al. | |
| 2017/0308082 A1 | 10/2017 | Ullrich et al. | |
| 2018/0202822 A1 | 7/2018 | DeLizio | |
| 2018/0211541 A1 | 7/2018 | Rakah et al. | |
| 2018/0321688 A1 | 11/2018 | Chase et al. | |
| 2018/0322775 A1 | 11/2018 | Chase et al. | |
| 2019/0061619 A1 | 2/2019 | Reymann et al. | |
| 2019/0072979 A1 | 3/2019 | Sukhomlinov et al. | |
| 2019/0156678 A1 | 5/2019 | Cole | |
| 2020/0380631 A1 | 12/2020 | Svitak et al. | |

* cited by examiner

AUTONOMOUS VEHICLE CONTROL SYSTEM AND METHOD

CROSS-REFERENCE TO RELATED APPLICATIONS

This application is a continuation of U.S. patent application Ser. No. 16/704,884, entitled "AUTONOMOUS VEHICLE CONTROL SYSTEM AND METHOD," filed Dec. 5, 2019, which is a continuation of U.S. patent application Ser. No. 15/942,912, entitled "AUTONOMOUS VEHICLE CONTROL SYSTEM AND METHOD," filed Apr. 2, 2018, now U.S. Pat. No. 10,520,942, issued Dec. 31, 2019, which claims priority to and the benefit of U.S. Provisional Application No. 62/481,442, entitled "AUTONOMOUS-BASED PARKING STRUCTURES," filed Apr. 4, 2017, each of which is hereby incorporated by reference in its entirety.

BACKGROUND

The present disclosure relates generally to autonomous vehicles and corresponding infrastructure. More specifically, the present disclosure relates to systems and methods incorporating features of autonomous vehicles, and fleets thereof, in parking structures.

As the automobile industry continues to expand automated navigation and control features of vehicles, traditional commuter vehicles (e.g., traditional cars) that are controlled (e.g., navigated, steered) primarily by a human user may become less prevalent. Indeed, vehicles that are controlled primarily by a human user may eventually become obsolete. Unfortunately, much of modern society's infrastructure is designed around accommodating a large number of these traditional vehicles. Accordingly, there is a need for reconciling the future of autonomous vehicles (and autonomous vehicle fleets) with modern society's infrastructure designed to accommodate traditional vehicles.

SUMMARY OF THE INVENTION

An embodiment of the present disclosure includes an autonomous vehicle control system. The system includes a first autonomous vehicle control center at a first location, and a second autonomous vehicle control center at a second location. The system also includes a controller configured to receive a first data input from the first autonomous vehicle control center and indicative of a first characteristic of the first autonomous vehicle control center, to receive a second data input from the second autonomous vehicle control center and indicative of a second characteristic of the second autonomous vehicle control center, and to receive a third data input indicative of an autonomous vehicle transport request or an autonomous vehicle storage request. The controller is also configured to select the first autonomous vehicle control center or the second autonomous vehicle control center based at least in part on the first data input, the second data input, and the third data input. Further, the controller is configured to instruct fulfillment of the autonomous vehicle transport request or the autonomous vehicle storage request based on the selection.

Another embodiment includes a method of autonomous vehicle control. The method includes receiving, via a controller, a first data input from a first autonomous vehicle control center disposed at a first location, where the first data input is indicative of a first characteristic of the first autonomous vehicle control center. The method also includes receiving, via the controller, a second data input from a second autonomous vehicle control center disposed at a second location, where the second data input is indicative of a second characteristic of the second autonomous vehicle control center. The method also includes receiving, via the controller, a third data input indicative of an autonomous vehicle transport request or an autonomous vehicle storage request. The method also includes selecting, based on the first data input, the second data input, and the third data input, between the first autonomous vehicle control center or the second autonomous vehicle control center. The method also includes instructing, based on the selection between the first autonomous vehicle control center and the second autonomous vehicle control center, respective fulfillment of the autonomous vehicle transport request or the autonomous vehicle storage request.

Still another embodiment of the present disclosure includes a method of controlling an autonomous vehicle control system. The method includes receiving, via a controller, a first data input from a first autonomous vehicle control center disposed at a first location, where the first data input is indicative of a first characteristic of the first autonomous vehicle control center. The method also includes receiving, via the controller, a second data input from a second autonomous vehicle control center disposed at a second location, where the second data input is indicative of a second characteristic of the second autonomous vehicle control center. The method also includes receiving, via the controller, a third data input indicative of an autonomous vehicle transport request. The method also includes receiving, via the controller, a fourth data input indicative of an additional autonomous vehicle transport request. The method also includes selecting, based on the first data input, the second data input, the third data input, and the fourth data input, the first autonomous vehicle control center or the second autonomous vehicle control center. The method also includes instructing, based on the selection, a single autonomous vehicle to fulfill the autonomous vehicle transport request and the additional autonomous vehicle request.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward autonomous vehicles and corresponding infrastructure. More specifically, the present disclosure relates to systems and methods incorporating features of autonomous vehicles, and fleets thereof, in parking structures. For example, the systems and methods disclosed herein relate to acquisition and/or financial management of a parking structure converted (e.g., adapted) into an autonomous vehicle control center. The systems and methods disclosed herein additionally relate to logistical management (e.g., capacity management, load management, ride sharing management) of one or more autonomous vehicle control centers and autonomous vehicles (e.g., fleets of autonomous vehicles) thereof. These and other features will be described in detail below.

As the automobile industry continues to expand automated navigation and control features of vehicles, traditional commuter vehicles (e.g., traditional cars) that are controlled (e.g., navigated, steered) primarily by a human user may become less prevalent. Indeed, vehicles that are controlled primarily by a human user may eventually become obsolete. Unfortunately, much of modern society's infrastructure is designed around accommodating a large number of these traditional vehicles. Accordingly, there is a need for reconciling the future of autonomous vehicles (and autonomous vehicle fleets) with modern society's infrastructure designed to accommodate traditional vehicles.

For example, modern vehicle infrastructures (e.g., highways, parking garages) are designed to accommodate a large number of traditional commuter vehicles. However, as autonomous vehicles become more prevalent, a total amount of vehicles may be reduced. Indeed, autonomous vehicles may be more readily equipped for ride sharing, which may reduce a necessity for individual vehicle ownership. Accordingly, portions of modern vehicle infrastructures (e.g., business parking garages designed to accommodate a large number of traditional commuter vehicles) may become obsolete. The present disclosure is directed toward adapting or converting parking structures into autonomous vehicle control centers, and utilizing the autonomous vehicle control centers. For example, a business owning the parking structure may sell or lease the parking structure to a company equipped to adapt/convert the parking structure into the autonomous vehicle control center, and/or equipped to manage the autonomous vehicle control center. In exchange for the parking structure, the business may receive money down, a portion of future profits or sales/revenue of the converted autonomous vehicle control center (e.g., profit or revenue sharing), and/or discounts for employees' use of the converted autonomous vehicle control center.

After the company purchases, leases, or otherwise acquires possession/use of the parking structure, the company may convert the parking structure into the autonomous vehicle control center. For example, the parking structure may include several areas or regions (e.g., floors, levels) devoted to specific services, tasks, or amenities of the autonomous vehicle control center. A first region may be utilized for storing (e.g., parking) autonomous vehicles. A fleet of the autonomous vehicles stored in the first region may be owned by the company, and other vehicles may be owned by individuals who pay the company for space in the autonomous vehicle control center. In certain embodiments, the company may own, lease, or otherwise possess a fleet of autonomous vehicles that is designed to be used for transport of employees (e.g., of the business from which the company acquired the structure) to, and from, the autonomous vehicle control center. In other words, each vehicle of the fleet of autonomous vehicles may be utilized to transport several employees of the business from homes of the several employees to the autonomous vehicle control center (e.g., proximate to the business which for which the employees work), often in one round trip. The autonomous vehicles may also transport employees to, and from, other locations, such as a grocery store, a restaurant, etc.

For several reasons, the autonomous vehicle control center may include a capacity and/or load management system equipped to determine capacity and/or load concerns of the autonomous vehicle control center. For example, because the autonomous vehicle control center (or first region [e.g., level] thereof) may be equipped to receive third party vehicles (e.g., autonomous or manually operated), because the third party vehicles may arrive unexpectedly, because ride sharing routes of individual autonomous vehicles of the fleet may vary day-to-day (e.g., to transport employees of the business, and third party customers), and because the fleet of autonomous vehicles owned by the company may be variably parked/stored across several autonomous vehicle control centers owned by the company, a capacity and/or load management system of the autonomous vehicle control center(s) may be beneficial. As suggested above, in some embodiments, the company may own, possess, or otherwise have access to several autonomous vehicle control centers (e.g., a network of autonomous vehicle control centers), and the capacity and/or load management system may involve capacity/load sharing across the control centers of the network.

Other regions of the autonomous vehicle control center may include a vehicle maintenance and repair center (e.g., for autonomous vehicles of the fleet, or for third party vehicles), dining establishments, a dry cleaning service, entertainment services, a delivery dock, and other features. As previously described, employees of the business may receive a discount on certain services, where the discounts are a part of the transaction between the business that previously owned the parking structure, and the company that purchased the parking structure and converted it into the autonomous vehicle control center.

In accordance with the present disclosure, it should be noted that reference to the term "autonomous vehicle transport request" or "transport request" refers to a request for pick-up, e.g., a request from a customer (or portable device of the customer) seeking a ride from one location to another. Further, reference to the term "autonomous vehicle storage request" refers to a request for storage, e.g., a request from an autonomous vehicle (or a controller or device thereof) for storing the autonomous vehicle. Further, it should be noted that the control features described below may relate to analyzing the data associated with the above-described requests, and responding to the request by instructing one or more autonomous vehicles to carry out or fulfill the request (e.g., by causing the autonomous vehicle to retrieve a customer based on a transport request, by causing the autonomous vehicle to move to a particular storage or control center based on a storage request, etc.). These and other features will be described in detail below.

Figure 1:
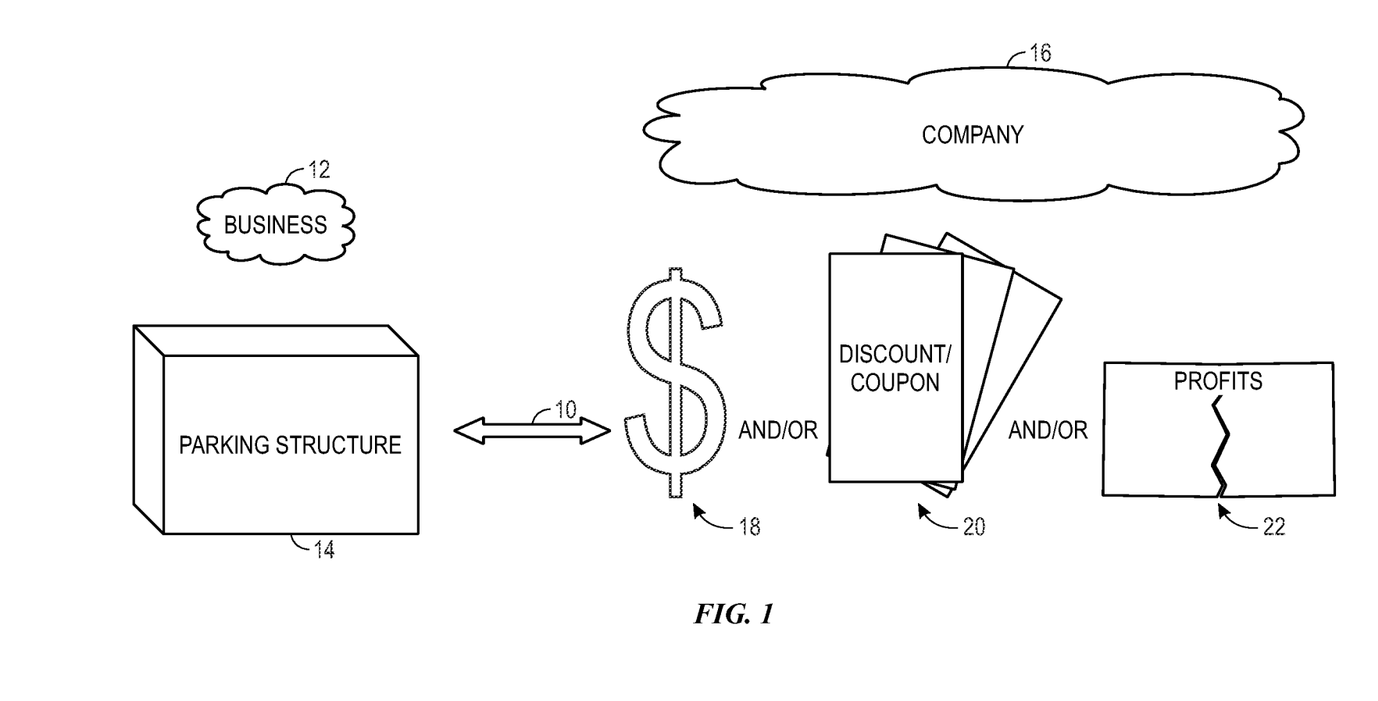
FIG. 1 is a schematic illustration representative of a transaction or agreement between a business owning a traditional parking structure, and a company seeking to adapt the traditional parking structure into an autonomous vehicle control center, in accordance with an aspect of the present disclosure.

Turning now to the drawings, FIG. 1 is a schematic illustration representative of a transaction 10 (e.g., agreement) between a business 12 owning a traditional parking structure 14, and a company 16 seeking to adapt the traditional parking structure 14 into an autonomous vehicle control center. For example, as previously described, the advent and expansion of autonomous vehicles may reduce a necessity of individual vehicle ownership (e.g., traditional commuter vehicles), thereby resulting in the traditional parking structure 14 having a total capacity in excess of a need of the business 12 and its employees. Accordingly, the business 12 may seek to sell or lease the traditional parking structure 14 to a third party (e.g., the company 16) that can make better use of it. In the illustrated embodiment, the company 16 may offer cash 18 (e.g., cash down), discounts 20 (e.g., to employees of the business 12) for use of services provided by the company 16, and/or profit (or sales/revenue) sharing 22 on future profits (or sales/revenue) by the company 16 (e.g., related to conversion of the parking structure 14 into an autonomous vehicle control center, and use thereof [by employees of the business 12, and others]). In some embodiments, the business 12 may transfer ownership or possession of the parking structure 14 without any immediate compensation, but instead in exchange for downstream profits and/or discounts after the parking structure 14 is converted into the autonomous vehicle control system. Further, in some embodiments, the business 12 and the company 16 may enter a joint venture to convert the parking structure 14 into the autonomous vehicle control system (e.g., where the joint venture involves the profit sharing 22 illustrated in FIG. 1).

Figure 2:
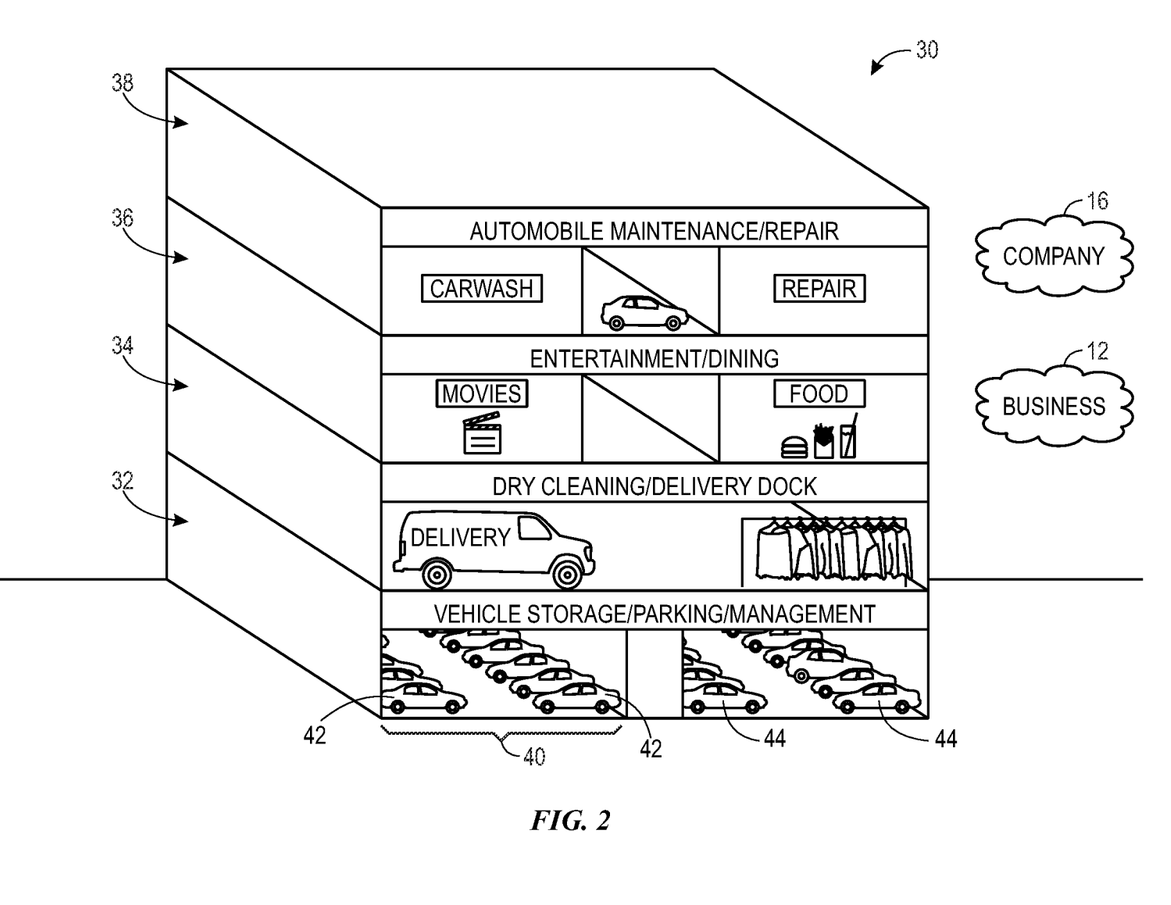
FIG. 2 is a schematic illustration of an embodiment of an autonomous vehicle control center adapted from the parking structure of FIG. 1, in accordance with an aspect of the present disclosure.

As described above, after the company 16 receives access (e.g., ownership, possession, or permission to use) to the parking structure 14, the company 16 may begin to convert the parking structure 14 into an autonomous vehicle control center. For example, FIG. 2 is a schematic illustration of an embodiment of an autonomous vehicle control center 30 (e.g., converted from the parking structure 14 of FIG. 1).

The illustrated autonomous vehicle control center 30 may include several regions. For example, the illustrated embodiment includes a first level 32, a second level 34, a third level 36, and a fourth level 38, where each of the levels 32, 34, 36, 38 may include one or more regions. In some embodiments, a region may extend across more than one of the levels 32, 34, 36, 38 (or a portion of a level). For simplicity of discussion, each service described below is confined to one of the levels 32, 34, 36, 38 in the illustrated embodiment. However, it should be understood that a single service may extend across multiple levels.

The first level 32 in the illustrated embodiment includes a vehicle storage, parking, and management service. For example, the company 16 operating the autonomous vehicle control center 30 may own, lease, or otherwise possess a fleet 40 of autonomous vehicles 42. The vehicles 42 of the fleet 40 may be parked on the first level 32. Further, third party vehicles 44 (e.g., autonomous or manually operated vehicles may be parked on the first level 32). As will be described with reference to later figures, management systems in accordance with the present disclosure may be utilized to manage financial and logistical (e.g., capacity/load/ride sharing) aspects of the first level 32.

The second level 34 in the illustrated embodiment includes a dry cleaning and delivery dock service (e.g., where the delivery dock is utilized by the business 12, or by individual employees of the business). The third level 36 in the illustrated embodiment includes entertainment (e.g., movies) and dining services (e.g., food and drink). The fourth level 38 in the illustrated embodiment includes automobile maintenance and repair services. It should be understood that the illustrated services are non-limiting, and that other services are also possible. As will be described with reference to later figures, management systems in accordance with the present disclosure may be utilized to manage financial and/or logistical aspects of the first, second, third, and fourth levels 32, 34, 36, 38 (and corresponding services).

Figure 3:
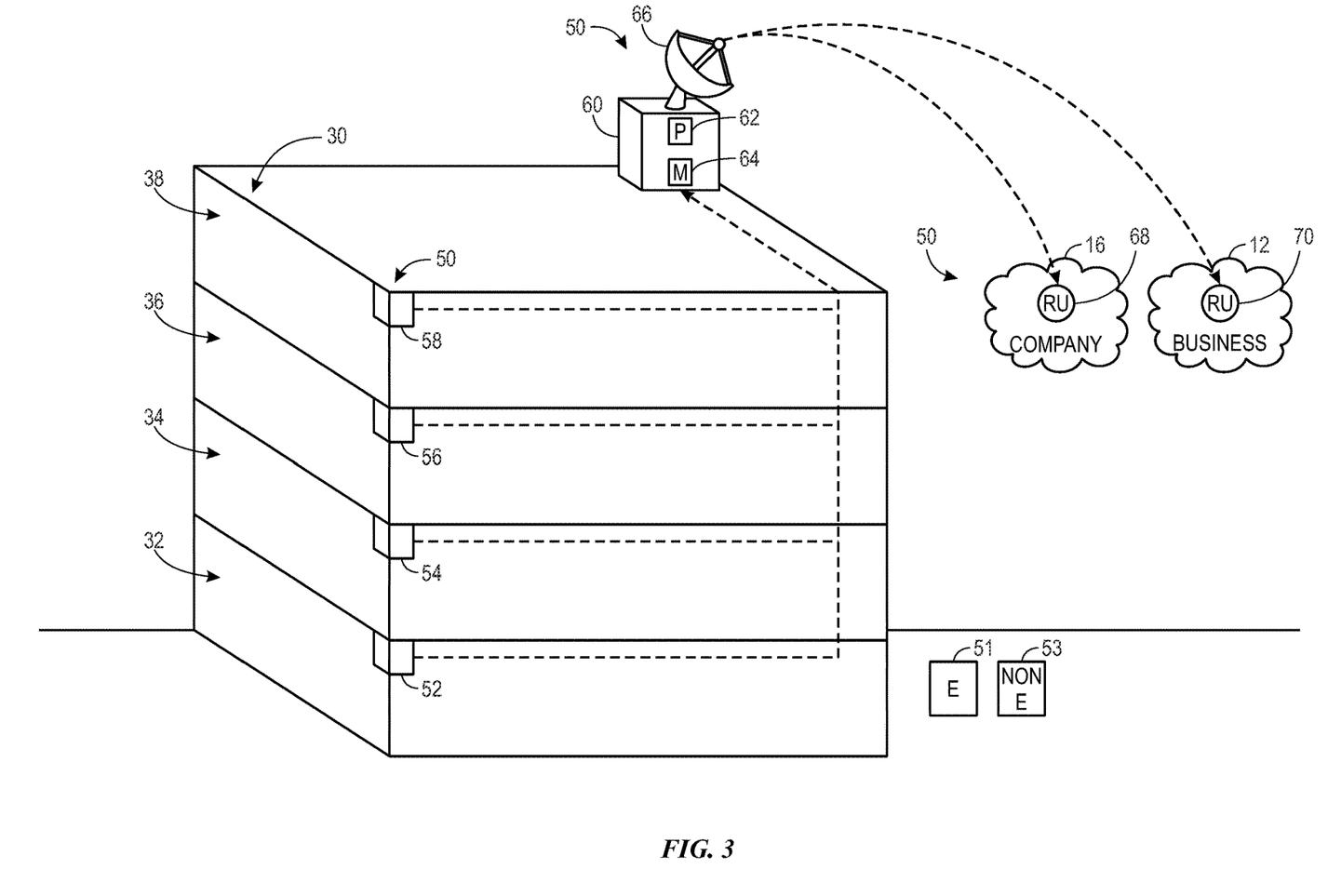
FIG. 3 is a schematic illustration of an embodiment of a system configured to enable financial management of the autonomous vehicle control center in FIG. 2, in accordance with an aspect of the present disclosure.

FIG. 3 is a schematic illustration of an embodiment of a system 50 configured to enable financial management of the autonomous vehicle control center 30 (e.g., of FIG. 2). As previously described, the company 16 operating the autonomous vehicle control center 30 may generate revenue based on employees 51 of the business 12, and third party customers 53 (e.g., non-employees of the business 12), utilizing the autonomous vehicle control center 30. Further, as previously described, the employees 51 of the business 12 may receive discounts on services offered in the autonomous vehicle control center 30. Further still, as previously described, the business 12 may receive a share of profits or revenues generated from the autonomous vehicle control center 30. In some embodiments, the profit or revenue sharing scheme may account for certain sales differently than others, e.g., based on a service involved in the sale, and based on whether the sale is to one of the employees 51 or to one of the third party customers 53. Accordingly, the financial management system 50 may account for discounted employees 51 of the business 12 (and, by extension, third party customers 53 that may not receive discounts), may compute revenues or profits generated by the autonomous vehicle control center 30, and may compute a profit or revenue distribution between the company 16 and the business 12. The financial management system may generally include registers 52, 54, 56, 58 associated with each of the levels 32, 34, 36, 38 of the autonomous vehicle control center 30, a control module 60 having a processor 62 and a memory 64, and a communications system 66. Each of these components will be described in detail below.

As set forth above, the financial management system 50 of the autonomous vehicle control center 30 may include one or more registers 52, 54, 56, 58 that tollsales/revenues generated at each of the levels 32, 34, 36, 38 of the autonomous vehicle control center 30. Because the transaction or agreement between the company 16 and the business 12 (e.g., the transaction 10 of FIG. 1) may involve a profit or revenue distribution scheme that varies by service offered in the autonomous vehicle control center, the illustrated embodiment includes registers 52, 54, 56, 58 corresponding with each of the four illustrated levels 32, 34, 36, 38, respectively. In other words, the register 52 may toll sales/revenues corresponding with services on the first level 32, the register 54 may toll sales/revenues corresponding with services on the second level 34, the register 56 may toll sales/revenues corresponding with services on the third level 36, and the register 52 may toll sales/revenues corresponding with services on the fourth level 38. The registers 52, 54, 56, 58 may also track whether a particular sale involves an employee (e.g., the employee 51) or a third party customer (e.g., the third party customer 53), which may be beneficial in situations where the transaction (e.g., transaction 10 of FIG. 1) between the company 16 and the business 12 involves a profit distribution scheme having distribution ratios that vary based on the source of sale (e.g., a sale to the employee 51, or a sale to the third party customer 53). In some embodiments, the registers 52, 54, 56, 58 may correspond to different areas, and/or additional/fewer registers may be used.

Each of the registers 52, 54, 56, 58 may be communicatively coupled with a control module 60 of the system 50. The control module 60 may include a processor 62 and a memory 64, where the memory 64 includes instructions stored thereon that, when executed by the processor 62, cause the control module 60 to perform various acts or functions. For example, the memory 64 may include instructions and an algorithm stored thereon that, when executed by the processor 62, enable a calculation of profit distribution (or sales/revenue distribution) between the company 16 and the business 12, or enable other calculations, such as an amount of sales/revenues that are derived from discounted employees (e.g., the employee 51) of the business 12. As suggested above, the algorithm may calculate revenue distribution as a function of a source of sales (e.g., to the employee 51 or to the third party customer 53), a service-type involved in the sales, and other factors. Present embodiments may make computer operation more efficient by directly linking activities with corresponding revenue distributions. Further, present embodiments may eliminate unnecessary calculations, and, thus, improve system operational efficiency by discarding unnecessary information (e.g., employee-related activity that is not relevant to revenues) prior to procedures for determining distributions.

The control module 60 may also include a communications system 66 (e.g., an Internet system) capable of transmitting communications to a receiving unit 68 of the company 16, to a receiving unit 70 of the business 12, or to both. Access to information from the control module 60 (e.g., by the receiving units 68, 70) may be password protected. In some embodiments, the company 16 and/or the business 12 may access the control module 60 directly in order to access the results of the algorithm(s) described above. Further, in some embodiments, the control module 60 may be located off-site, and each of the registers 52, 54, 56, 58 may transmit data to the off-site location (e.g., via the illustrated communications system 66, or a similar communications system).

By including access to the control module 60 (and, thus, information regarding sales/revenues of the autonomous vehicle control center 30) for both the company 16 operating the autonomous vehicle control center 30 and the business 12 from which the company 16 derived the autonomous vehicle control center 30, appropriate use and/or profit distributions of the autonomous vehicle control center 30 may be ensured. In other words, by providing the business 12 and the company 16 access to the information derived by the control module 60, the business 12 can ensure that any transaction between the business 12 and the company 16 involving specific distribution of sales/revenues or profits generated from the autonomous vehicle control center 30 (or otherwise requiring such calculations) are upheld by the company 16.

Figure 4:
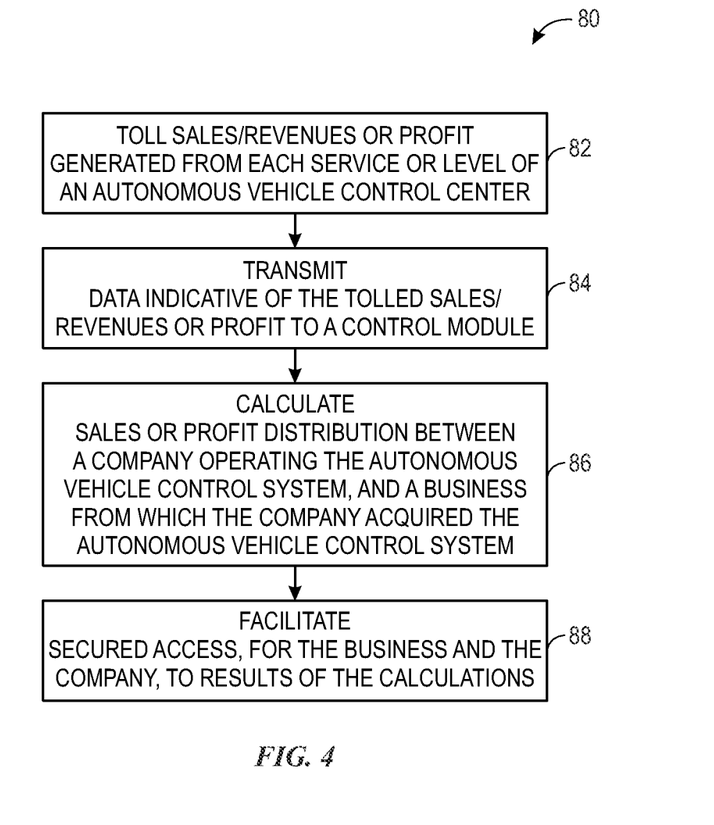
FIG. 4 is a process flow diagram illustrating an embodiment of a method of financially managing the autonomous vehicle control center of FIG. 2, in accordance with an aspect of the present disclosure.

FIG. 4 is a process flow diagram illustrating an embodiment of a method 80 of financially managing the autonomous vehicle control center 30 of FIG. 2. In the illustrated embodiment, the method 80 includes tolling (block 82) sales/revenues or profits generated from each service or level of an autonomous vehicle control center. For example, as previously described, the autonomous vehicle control center may be converted from a parking structure that a company acquires from a business. Each level or service included in the converted autonomous vehicle control center may include an individual register configured to toll sales/revenues or profits generated from the corresponding level or service(s) thereof. The register may also track whether each sale is to an employee of the business (e.g., from which the company acquired the original parking structure), or to a third party customer (e.g., a non-employee of the business).

The method 80 also includes transmitting (block 84) data indicative of the tolled sales/revenues or profit to a control module. For example, as previously described, each register may be communicatively coupled to an on-site or off-site control module (or database/server). Indeed, the registers may be wirelessly coupled (or coupled via wire) to the control module. The method 80 also includes calculating (block 86) a profit or sales/revenue distribution between the company operating the autonomous vehicle control system, and the business from which the company acquired the autonomous vehicle control system. For example, as previously described, the profit (or sales/revenue) sharing scheme may include calculations based on service-type, source of sale (e.g., employee or non-employee), etc.

The method 80 also includes facilitating (block 88) secured access, for the business and the company, to results of the calculations (e.g., of block 86). For example, as previously described, a communications system of the control module may transmit reports having the data/information described above (e.g., tolled sales and/or figures indicative of distributions of profits/revenues) to the receiving components of the business and the company. The transmissions from the control module may be password protected. Additionally or alternatively, data or information generated by the control module may be directly accessed from the control module by the company or the business (e.g., where direct access to the control module itself may be password protected). This direct access provides system operational efficiencies and improves operation of the related control system.

Figure 5:
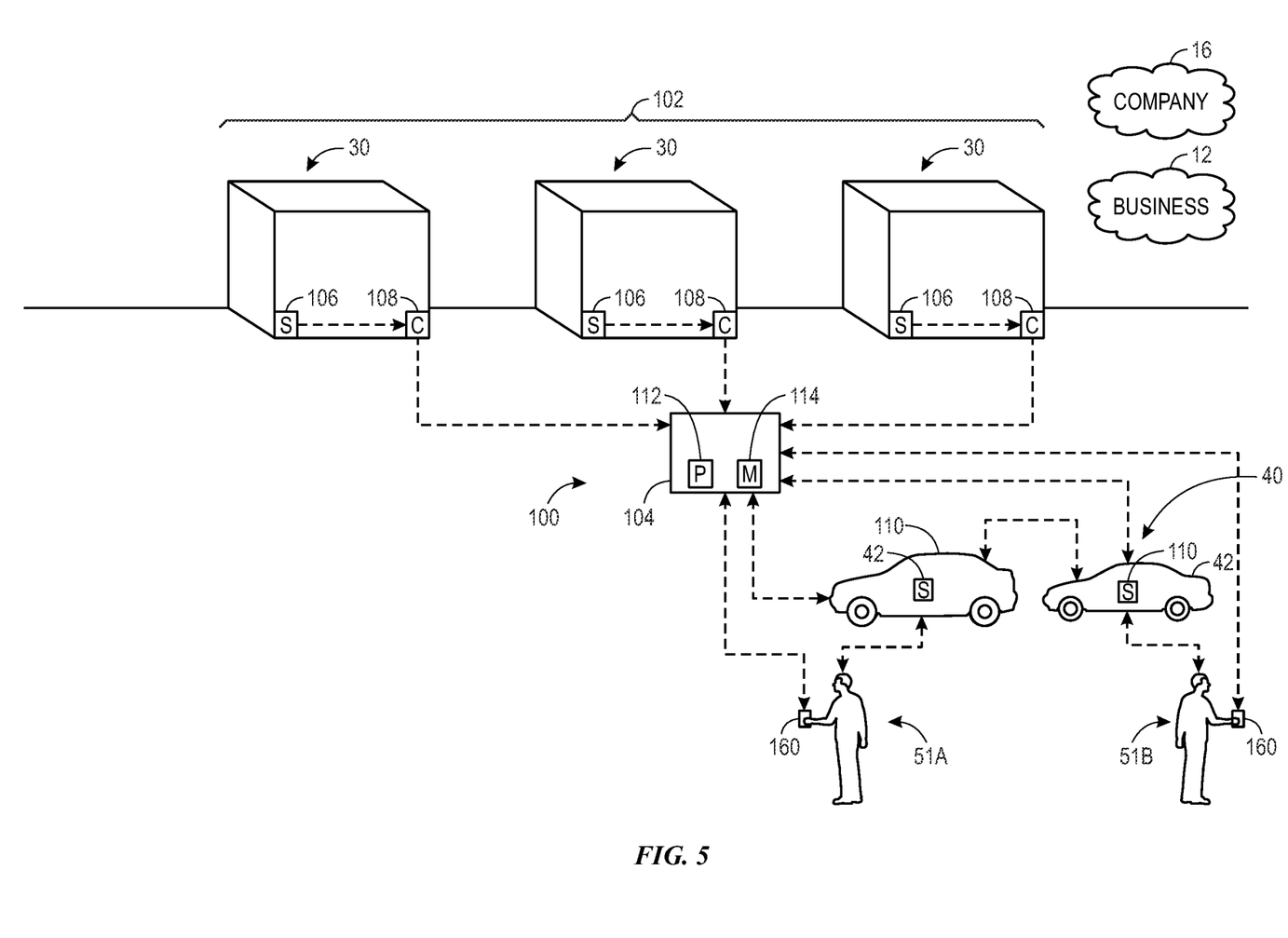
FIG. 5 is a schematic illustration of an embodiment of a system configured to enable capacity, load, and/or ride sharing management of a network of autonomous vehicle control centers, in accordance with an aspect of the present disclosure.

FIG. 5 is a schematic illustration of an embodiment of a capacity, load, and/or ride sharing management system 100 of a network 102 of autonomous vehicle control centers 30. In the illustrated embodiment, the capacity/load/ride sharing management system 100 includes a controller 104, sensor systems 106 (e.g., each sensor system 106 corresponding with one of the autonomous vehicle control centers 30), and one or more communication systems 108 (e.g., each corresponding with one of the autonomous vehicle control centers 30). Vehicle sensors 110 may also be included in the capacity/load/ride sharing management system 100.

In the illustrated embodiment, the company 16 may own or operate the network 102 of autonomous vehicle control centers 30. Each of the autonomous vehicle control centers 30 is equipped with the sensor system 106, as described above. Each sensor system 106 may include one or more sensors configured to detect a load or capacity of the corresponding control center 30 (or individual levels, regions, or parking spaces thereof). A load sensor of the sensor system 106 may detect a weight of vehicles within the control center 30 (e.g., the load sensor may be a scale). A capacity sensor of the sensor system 106 may detect a presence of vehicles within the control center 30 (e.g., the capacity sensor may be an optical sensor configured to detect a presence of a vehicle in a parking space).

The system 100 also includes the controller 104, which is communicatively coupled to each of the sensor systems 106 via the communication systems 108 corresponding with the sensor systems 106. The sensor systems 106 may send to the controller 104 (via the communication systems 108) data indicative of a load or capacity condition of the corresponding autonomous vehicle control centers 30.

The controller 104 may include a processor 112 and a memory 114, where the memory 114 includes instructions stored thereon that, when executed by the processor 112, cause the controller 104 to perform various acts or functions. For example, as previously described, the company 16 may utilize the network 102 of autonomous vehicle control centers 30, along with the fleet 40 of autonomous vehicles 42, in a ride sharing scheme to transport people (e.g., employees 51a, 51b of the business 12) to and from the autonomous vehicle control centers 30, or between different locations while using the automated vehicle control center 30 as a temporary parking and/or refueling station. In some embodiments, the autonomous vehicle control centers 30 may be close enough in proximity (e.g., to each other, or to the business 12) such that any one (or a sub-set) of the autonomous vehicle control centers 30 of the network 102 is a candidate for receipt of a particular autonomous vehicle 42 transporting particular people (e.g., employees 51a, 51b of the business 12).

Thus, the controller 104 may, in certain operating modes or embodiments, receive data indicative of loads or capacities of each of the autonomous vehicle control centers 30, and based on said data, determine which of the control centers 30 to direct one or more of the autonomous vehicles 42 of the fleet 40. In doing so, the controller 104 may balance load/capacity distributions across the network 102, while maintaining an ability to facilitate efficient ride sharing scheme. This improves operation of the controller by avoiding excessive processing associated with inefficient transition/tracking of the autonomous vehicles 42. As suggested in the illustrated embodiment, each of the autonomous vehicles 42 may include vehicle sensors 110 configured to determine parameters of the autonomous vehicle 42 (e.g., a weight of the vehicle 42, an amount of gas [or charge] included in the vehicle 42 [which may affect the weight of the vehicle 42], a location of the vehicle 42, and other factors). The vehicle sensors 110 may communicate to the controller 104 data indicative of the parameters detected by the vehicle sensors 110. Thus, the controller 104 may utilize the data received from the vehicle sensors 110, in conjunction with (or separate from) the data received from the sensor systems 106 of the autonomous vehicle control centers 30, to determine an appropriate one of the control centers 30 to send a particular autonomous vehicle 42.

While autonomous vehicles 42 of the fleet 40 owned or operated by the company 12 are described above, the sensor systems 106 of the autonomous vehicle control centers 30 may detect parameters of third party vehicles as well. Third party vehicles may optionally connect with the controller 104 to allow the controller 104 to instruct the third party vehicles which of the control centers 30 (of the network 102) is available for parking, includes an appropriate fuel source (e.g., electrical charging, replacement batteries, or petroleum), and so forth (e.g., other maintenance options). Indeed, load/capacity requirements of the control centers 30 may require such information.

Further, with respect to the previously described ride sharing scheme, load and capacity requirements may not be the only consideration of the controller 104 when determining where to send particular autonomous vehicles 42 of the fleet 40. Indeed, an amount of gas remaining in a certain autonomous vehicle 42 (and the corresponding expected distance the autonomous vehicle 42 can travel, and the location of the autonomous vehicle 42 with respect to one or more of the control centers 30 of the network 102) may be taken into consideration by the controller 104. In other words, the memory 114 of the controller 104 may include a ride sharing algorithm stored thereon that, when executed by the processor 112, causes the controller 104 to determine a destination of each autonomous vehicle 42 in real-time. The algorithm may be a function of several factors including, but not limited to, any one or more of: loads on each control center 30, capacities of each control center 30, locations of the autonomous vehicles 42, weights of the autonomous vehicles 42, sizes of the autonomous vehicles 42, a number of occupants in (or expected to be received by) each of the autonomous vehicles 42, a type of occupant (e.g., employee of the business 12, third party customer) in the autonomous vehicles 42, a distance between each autonomous vehicle 42 and one or more of the control centers 30 of the network 102, an expected travel time between each autonomous vehicle 42 and one or more of the control centers 30 of the network 102, maintenance needs, etc. This algorithm may improve system functionality and create efficiencies overall in the control centers 30 and related computer systems.

It should also be noted that the capacity/load/ride sharing system 100 may take into account customer requests when making any of the determinations described above. For example, if one employee 51a of the business 12 requires specific parameters of one of the autonomous vehicles 42 (e.g., a vehicle having a particular capacity, a particular speed, a particular aesthetic), the employee 51a may utilize an electronic communications device 160 (e.g., a portable electronic device or handheld electronic communications device, such as a cell phone) to communicate the request to the controller 104. Communication between the handheld devices 160 and the controller 104 may be bi-directional, such that the controller 104 may indicate to the employees 51a, 51b whether a particular request was accepted or denied, and an expected arrival time of the corresponding vehicles 42. In the illustrated embodiment, the customer 51a requested (and received) a sedan, while the customer 51b requested (and received) a pickup truck.

Figure 6:
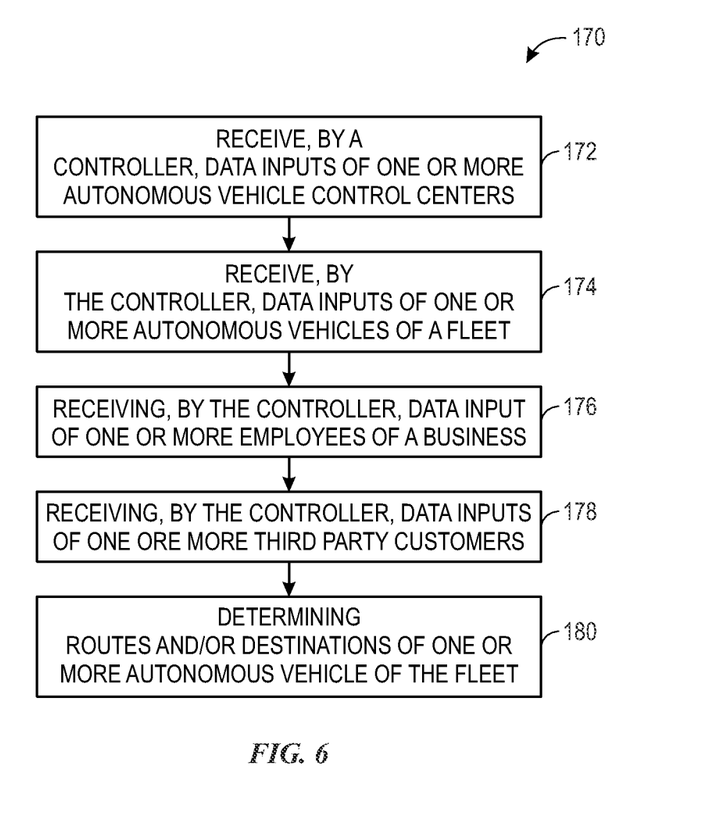
FIG. 6 is a process flow diagram illustrating an embodiment of a method of capacity management of a network of autonomous vehicle control centers, in accordance with an aspect of the present disclosure.

FIG. 6 is a process flow diagram illustrating an embodiment of a method 170 of logistical management of a network of autonomous vehicle control centers 30. It should be understood the method 170 illustrated in FIG. 6 and described in detail below may include any one or more of the associated blocks (172, 174, 176, 178, 180). In other words, the method 170 may include only some of the illustrated blocks (172, 174, 176, 178, 180) and corresponding steps.

As shown, the method 170 includes receiving (block 172), by a controller, data inputs of one or more autonomous vehicle control centers. The data inputs from the autonomous vehicle control centers may include any one or more of: current loads on the autonomous vehicle control centers (e.g., by weight), current capacities of the autonomous vehicle control centers (e.g., by number of vehicles), locations of the autonomous vehicle control centers, and availability of autonomous vehicles at each autonomous vehicle control center (e.g., where the availability of autonomous vehicles includes descriptions of the autonomous vehicles, such as size, capacity, aesthetic, performance, and other descriptions).

The method 170 also includes receiving (block 174), by the controller, data inputs of one or more autonomous vehicles of a fleet of autonomous vehicles (e.g., spread across a network of autonomous vehicle control centers). For example, when the autonomous vehicle is in use, either the autonomous vehicle or one of the control centers may communicate information about the autonomous vehicle to the controller. Such data inputs may be indicative of a size of the vehicle, a capacity of the vehicle, an aesthetic of the vehicle, a performance of the vehicle, an amount of gas in the vehicle, a location of the vehicle, an expected time of arrival of the vehicle at a particular one of the autonomous vehicle control centers, etc.

The method 170 also includes receiving (blocks 176 and 178), by the controller, data inputs of one or more employees of the business from which the one or more of the autonomous vehicle control centers was initially acquired, and of one or more third party customers (e.g., non-employees of the business), respectively. Such data inputs may include one or more of a vehicle request (including customizable options such as desired performance, capacity, or aesthetic of the vehicle), a location of the employee or customer, a desired destination of the employee or customer, a total number of passengers needing a ride, and other factors.

The method 170 also includes determining (block 180) routes and/or destinations of the one or more autonomous vehicles of the fleet. For example, as autonomous vehicles travel to retrieve employees of the business (and/or others [e.g., third party customers]), the controller may determine, based on the inputs set forth above, the routes and/or destinations. Because the controller receives the data inputs in real time, the controller may efficiently determine the routes and/or destinations based on the factors described above, may adjust routes and/or destinations based on the factors described above, and/or may cancel routes or destinations based on changes in the factors described above.

In accordance with present embodiments, the disclosed conversion of parking structures to autonomous vehicle control centers facilitates the use of structures that may otherwise become obsolete as autonomous vehicle technologies expand. Further, the disclosed financial and logistical management systems and techniques enable efficient use of the autonomous vehicle control centers, thereby reducing a complexity of individual commutes (e.g., of employees to [and from] a business associated with the autonomous vehicle control center).

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. One or more tangible, non-transitory, computer readable media comprising instructions thereon that, when executed by at least one processor, cause the at least one processor to:
   receive a first data input indicative of a first characteristic of a first autonomous vehicle control center;
   receive a second data input indicative of a second characteristic of a second autonomous vehicle control center;
   receive a third data input corresponding to an autonomous vehicle transport request or an autonomous vehicle storage request; and
   instruct fulfillment of the autonomous vehicle transport request or the autonomous vehicle storage request based on the third data input and based on at least one of the first data input or the second data input.

2. The one or more tangible, non-transitory, computer readable media of claim 1, wherein the instructions, when executed by the at least one processor, cause the at least one processor to instruct the fulfillment of the autonomous vehicle storage request by the first autonomous vehicle control center and not the second autonomous vehicle control center based at least on the first data input, wherein the first data input includes data indicative of an available storage capacity of the first autonomous vehicle control center.

3. The one or more tangible, non-transitory, computer readable media of claim 1, wherein the instructions, when executed by the at least one processor, cause the at least one processor to instruct fulfillment of the autonomous vehicle transport request by the first autonomous vehicle control center and not the second autonomous vehicle control center based at least on the first data input, wherein the first data input includes data indicative of a number of available autonomous vehicles at the first autonomous vehicle control center.

4. The one or more tangible, non-transitory, computer readable media of claim 1, wherein the instructions, when executed by the at least one processor, cause the at least one processor to instruct fulfillment of the autonomous vehicle transport request by the first autonomous vehicle control center and not the second autonomous vehicle control center based at least on the first data input, wherein the first data input includes data indicative of a type of an available autonomous vehicle at the first autonomous vehicle control center.

5. The one or more tangible, non-transitory, computer readable media of claim 4, wherein the data indicative of the type of the available autonomous vehicle at the first autonomous vehicle control center is indicative of the available autonomous vehicle being a sedan or a truck.

6. The one or more tangible, non-transitory, computer readable media of claim 1, wherein the instructions, when executed by the at least one processor, cause the at least one processor to analyze the third data input to identify a type of an autonomous vehicle corresponding to the autonomous vehicle transport request.

7. The one or more tangible, non-transitory, computer readable media of claim 6, wherein the instructions, when executed by the at least one processor, cause the at least one processor to analyze the third data input to identify the type of the autonomous vehicle corresponding to the autonomous vehicle transport request by identifying that the autonomous vehicle is a sedan or a truck.

8. The one or more tangible, non-transitory, computer readable media of claim 1, wherein the instructions, when executed by the at least one processor, cause the at least one processor to receive, as the third data input corresponding to the autonomous vehicle storage request, data indicative of a type, size, or weight of an autonomous vehicle corresponding to the autonomous vehicle storage request.

9. The one or more tangible, non-transitory, computer readable media of claim 1, wherein the instructions, when executed by the at least one processor, cause the at least one processor to instruct the fulfillment of the autonomous vehicle transport request or the autonomous vehicle storage request based on the first data input, the second data input, and the third data input.

10. The one or more tangible, non-transitory, computer readable media of claim 1, wherein the instructions, when executed by the at least one processor, cause the at least one processor to:
receive, as the first data input indicative of the first characteristic of the first autonomous vehicle control center, data indicative of a first location of the first autonomous vehicle control center;
receive, as the second data input indicative of the second characteristic of the second autonomous vehicle control center, data indicative of a second location of the second autonomous vehicle control center; and
receive, as the third data input corresponding to the autonomous vehicle transport request or the autonomous vehicle storage request, data indicative of:
a vehicle location of an autonomous vehicle corresponding to the autonomous vehicle storage request; or
a user location of a user corresponding to the autonomous vehicle transport request.

11. One or more tangible, non-transitory, computer readable media comprising instructions thereon that, when executed by at least one processor, cause the at least one processor to:
receive a first data input indicative of a characteristic of an autonomous vehicle control center;
receive a second data input corresponding to an autonomous vehicle transport request or an autonomous vehicle storage request; and
instruct fulfillment of the autonomous vehicle transport request or the autonomous vehicle storage request based on identification of a correlation between the first data input and the second data input.

12. The one or more tangible, non-transitory, computer readable media of claim 11, wherein the instructions, when executed by the at least one processor, cause the at least one processor to analyze the first data input to identify:
a type of an available autonomous vehicle at the autonomous vehicle control center;
an available storage capacity of the autonomous vehicle control center; or
a number of available autonomous vehicles at the autonomous vehicle control center.

13. The one or more tangible, non-transitory, computer readable media of claim 11, wherein the instructions, when executed by the at least one processor, cause the at least one processor to identify the second data input as corresponding to a type, size, or weight of an autonomous vehicle.

14. The one or more tangible, non-transitory, computer readable media of claim 11, wherein the instructions, when executed by the at least one processor, cause the at least one processor to:
identify the first data input as being indicative of a first location of the autonomous vehicle control center; and
identify the second data input as corresponding to vehicle characteristic or a second location of a vehicle or a vehicle characteristic.

15. The one or more tangible, non-transitory, computer readable media of claim 11, wherein the instructions, when executed by the at least one processor, cause the at least one processor to:
receive, after instructing the fulfillment of the autonomous vehicle transport request or the autonomous vehicle storage request based on the first data input and the second data input, a third data input indicative of a first change to the characteristic of the autonomous vehicle control center, or indicative of a second change to the autonomous vehicle storage request or the autonomous vehicle transport request, or indicative of both the first change and the second change; and
instruct cancellation of the fulfillment of the autonomous vehicle transport request or the autonomous vehicle storage request based on the third data input.

16. A computer-implemented method, comprising:
receiving, at one or more processors, a first data input indicative of a first characteristic of a first autonomous vehicle control center;
receiving, at the one or more processors, a second data input indicative of a second characteristic of a second autonomous vehicle control center;
receiving, at the one or more processors, a third data input corresponding to an autonomous vehicle transport request or an autonomous vehicle storage request; and
instructing, via the one or more processors, fulfillment of the autonomous vehicle transport request or the autonomous vehicle storage request based on the third data input and based on at least one of the first data input or the second data input.

17. The computer-implemented method of claim 16, comprising receiving, at the one or more processors and as the first data input indicative of the first characteristic of the first autonomous vehicle control center, data indicative of:
a type of an available autonomous vehicle at the first autonomous vehicle control center;
a number of available autonomous vehicles at the first autonomous vehicle control center; or
an available storage capacity of the first autonomous vehicle control center.

18. The computer-implemented method of claim 16, comprising receiving, at the one or more processors and as the third data input corresponding to the autonomous vehicle transport request, data indicative of a type of an autonomous vehicle corresponding to the autonomous vehicle transport request.

19. The computer-implemented method of claim 16, comprising receiving, at the one or more processors and as the third data input corresponding to the autonomous vehicle storage request, data indicative of a type, size, or weight of an autonomous vehicle corresponding to the autonomous vehicle storage request.

20. The computer-implemented method of claim 16, comprising instructing, via the one or more processors, the fulfillment of the autonomous vehicle transport request or the autonomous vehicle storage request based on the first data input, the second data input, and the third data input.

* * * * *